Figure 1:
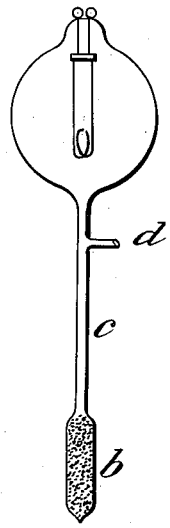

No. 815,942. PATENTED MAR. 27, 1906.
J. DEWAR.
METHOD OF ABSORBING GASES OR VAPORS AND THE PRODUCTION OF HIGH VACUUMS.
APPLICATION FILED APR. 25, 1905.

WITNESSES
INVENTOR
James Dewar
by Bakewell Byrnes
his attys

UNITED STATES PATENT OFFICE.

JAMES DEWAR, OF CAMBRIDGE, ENGLAND.

METHOD OF ABSORBING GASES OR VAPORS AND THE PRODUCTION OF HIGH VACUUMS.

No. 815,942.      Specification of Letters Patent.      Patented March 27, 1906.

Application filed April 25, 1905. Serial No. 257,352.

*To all whom it may concern:*

Be it known that I, JAMES DEWAR, professor of chemistry, a subject of the King of Great Britain, residing at 1 Scroope Terrace, Cambridge, England, have invented a certain new and useful Improved Method of Absorbing Gases or Vapors and the Production of High Vacua, of which the following is a specification.

It is known that charcoal absorbs many gases and that when heated to a red heat and exhausted to free it from its naturally-contained gas it is capable on cooling to the ordinary temperature of absorbing traces of gas left in a virtually vacuous space.

By my invention "charcoal," by which term I mean more or less pure carbon obtained by the destructive distillation or imperfect combustion of organic material or by the action of an agent like strong sulfuric acid on sugar or the like, is made a better absorbent for gases than it is at the ordinary temperature by cooling it to a temperature comparable with that at which the gas or vapor to be absorbed boils. As an instance of the effect of such cooling a mass of charcoal made from cocoanut-shells at the temperature of 0° centigrade and seven hundred and sixty millimeters pressure will absorb four cubic centimeters of hydrogen or eighteen cubic centimeters of oxygen. When it is cooled to 180° centigrade, it will absorb one hundred and thirty-five cubic centimeters of hydrogen or two hundred and thirty cubic centimeters of oxygen, both measured at 0° centigrade and seven hundred and sixty millimeters pressure.

According to my invention I apply this method of absorbing gases or vapors to the production of high vacua. For this purpose charcoal may be introduced into a suitable vessel which is in or is put into air-tight communication with the vessel to be exhausted. The charcoal, which acts best when it has been recently strongly heated, is now cooled to a temperature preferably about that at which the gas to be absorbed boils—for instance, by immersing the vessel containing it in liquid air. The charcoal absorbs the gas from the vessel being exhausted, and when it no longer continues to do so or the absorption has proceeded far enough communication between the two vessels may be cut off in any suitable manner.

It is obvious that the vessel containing the charcoal should be opened before its temperature is allowed to rise, or instead of cutting off the communication between the vessels that containing the charcoal may be retained immersed in liquid air so long as the vacuum is required.

It is obvious that it may be economical to combine the use of charcoal according to my invention with the use of an air-pump, as in this way the vessel to be exhausted may be greatly reduced in gaseous contents, thus enabling a smaller mass of charcoal to be used and a correspondingly smaller quantity of the cooling agent.

The amount of charcoal required depends on the specific power of condensation of the particular charcoal used, the nature of the gas or vapor to be exhausted, the volume to be absorbed, the desired degree of exhaustion, and the temperature to which the charcoal is cooled. When air is the gas to be absorbed, as in the manufacture of incandescent electric lamps or of tubes for emitting radiant electric energy, like Roengten tubes, some idea of the proportion which the charcoal should bear to the volume of air it is to absorb when liquid air is the cooling agent may be gathered from the following statement.

A vessel containing thirteen hundred cubic centimeters of air at atmospheric pressure was put into communication with thirty grams of cocoanut charcoal placed in a side vessel, and the latter was immersed in liquid air. The pressure within the vessel fell to fifty millimeters of mercury. When by means of a pump the same vessel was exhausted to half an atmospheric pressure before the charcoal was cooled, the cooling lowered the pressure to a vacuum higher than that in which an electric discharge produces the well-known striæ. When the pump was operated to reduce the pressure to one-fourth atmosphere before the cooling, the latter produced a vacuum in which it was exceedingly difficult to get an electric spark to pass. As it is very easy to use a proportion of charcoal larger than is likely to be required, I do not consider any further directions in this respect necessary to enable others to practice my invention.

Figure 2:
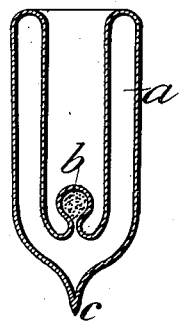

In the accompanying drawings, Figure 1 shows in elevation an ordinary incandescent electric lamp arranged to be exhausted by my method. The bulb *b*, communicating by capillary tube *c* with the lamp, contains charcoal and is heated strongly while an exhaust-pump is applied to the side tube $d$. When the pump has exhausted most of the gas from the tube and charcoal, the side tube $d$ is sealed and the cooled bulb $b$ is immersed in the liquid air. After a few minutes the carbon filament is heated to incandescence by the passage of an electric current, the tube $c$ is sealed, and the lamp is separated. Fig. 2 shows one form of the application of my invention to the production of an improved form of the well-known vacuum vessels in which liquid air is preserved from rapid evaporation.

The double-walled glass vessel $a$ is provided at the lower part of its inner wall with a recess $b$, which is filled with recently-ignited charcoal. The space between the walls may be advantageously exhausted by a pump before it is sealed at the point $c$ in order to diminish the quantity of charcoal required to produce a vacuum. When liquid air is poured into the vessel, the charcoal absorbs the air left in the space between the walls, so that this space becomes a high vacuum and remains so while there is enough liquid air in the vessel to cover the recess $b$.

Although it suffices to cool the charcoal to about the temperature at which the gas to be absorbed boils, the absorptive power of the charcoal is improved if its temperature be still further lowered by causing the cooling agent in which it is immersed to evaporate under reduced pressure.

The double-walled glass vessels may be internally coated with silver, or a little mercury may be placed at the bottom of the space between the walls in order to secure better heat isolation. If instead of oxygen or nitrogen being the residuary gas to be absorbed by the charcoal, a gas like carbonic acid is left in the space between the walls, then cooling the charcoal to 80° centigrade, which is the boiling-point of carbonic acid, will produce a good vacuum.

I claim—

1. A method of absorbing gases or vapors by exposing to the gas charcoal cooled to a temperature comparable with that at which the gas to be absorbed boils, substantially as described.

2. The production of high vacua by cooling to a temperature comparable with that at which the gas to be removed boils, a mass of charcoal within the space to be exhausted or in a vessel in communication therewith, substantially as described.

In testimony whereof I have signed my name to this specification in the presence of two subscribing witnesses.

JAMES DEWAR.

Witnesses:
G. F. WARREN,
OLIVER IRMAN.